United States Patent Office 3,502,665
Patented Mar. 24, 1970

3,502,665
PREPARATION OF 7-ACYLAMIDO DERIVATIVES OF 7-AMINOCEPHALOSPORANIC ACID AND RELATED COMPOUNDS
Lewis Aubrey Wetherill, Harrow, William Graham, Pinner, and Michael John Covill, London, England, assignors to Glaxo Laboratories Limited, Greenford, Middlesex, England, a British company
No Drawing. Filed May 24, 1965, Ser. No. 458,383
Claims priority, application Great Britain, May 28, 1964, 22,154/64
Int. Cl. C07d 99/24
U.S. Cl. 260—243
9 Claims

ABSTRACT OF THE DISCLOSURE

The preparation of a 7-acylamidocephalosporanic acid by the acylation of 7-aminocephalosporanic acid, an acid addition salt thereof or a derivative thereof having at the 3-position a group —$CH_2Y$, wherein Y is a group derived from a nucleophile, with an acyl halide under substantially anhydrous conditions in an inert Lewis base liquid under the conditions of the reaction which has a dielectric constant above 15 and contains a hydrogen halide acceptor which may be the Lewis base itself.

This invention is concerned with improvements in or relating to antibiotics derived from cephalosporin C.

N-deacylation of cephalosporin C yields the so-called nucleus of cephalosporin, viz 7 - aminocephalosporanic acid (7–ACA). This amine may then be acylated to yield 7-acylamidocephalosporanic acids analogous to cephalosporin C and also possessing anti-bacterial activity. Various methods have been proposed for the acylation of 7–ACA but, in general, these suffer from the disadvantage that the end-product is contaminated with substantial amounts of unchanged 7–ACA. Since the acylated 7–ACA is required for therapeutic purposes it will be appreciated that the presence of the residual 7–ACA is most undesirable. Efforts to avoid the presence of the residue by using excess acid halide have proved unavailing in conventional methods. A further disadvantage in having a residue of 7–ACA is that this is an expensive material to prepare and if any of this material remains un-acylated at the end of the reaction it is economically desirable to recover it. However, this adds to the overall expense of the process.

We have now found that 7–ACA or an acid addition salt thereof as described in our copending application No. 458,446, filed of even date herewith, can be acylated completely or almost completed by acyl halides if the reaction is effected under substantially anhydrous conditions in Lewis bases containing hydrogen halide acceptors.

According to the invention, therefore, there is provided a process for the acylation of 7–ACA or an acid addition salt thereof by means of an acyl halide (i.e. chloride or bromide) to yield a 7-acylamidocephalosporanic acid which comprises effecting the acylation under substantially anhydrous conditions in the liquid phase in an inert Lewis base (preferably one having a tertiary nitrogen atom) having a dielectric constant above 15, and preferably above 30, and containing a hydrogen halide acceptor. The dielectric constant of the base is advantageously within the range of 30–40.

The Lewis base used should be inert by which we mean inert to the acyl halide and the 7–ACA or salt thereof but it may function as a hydrogen halide acceptor. The Lewis base should be liquid under the reaction conditions and is preferably liquid at 20° C.

The Lewis base may itself function as the hydrogen halide acceptor depending on its capacity to absorb the hydrogen chloride or hydrogen bromide generated in the reaction. Simple trial and error experimentation will show whether or not an additional hydrogen halide acceptor is necessary in order to avoid the presence of any substantial residue of 7–ACA on completion of the reaction. Additional hydrogen halide acceptors which may be used include basic substances such as alkali metal and alkaline earth metal carbonates and bicarbonates, e.g. calcium carbonate, lithium carbonate, strontium carbonate or barium carbonate. Preferably the inorganic basic substance is used in a finely powdered state, advantageously of a particle size less than 10 microns. Organic tertiary bases which may be used as hydrogen halide acceptors include tertiary aliphatic amines e.g. tri(lower-alkyl) amines e.g. triethylamine.

Lewis bases which are preferred for the purpose of the invention are those containing one of the following groups:

(a) 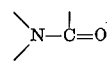

(b) $-C\equiv N$

Suitable Lewis bases for the process of this invention may thus be chosen from the group of substituted amides of the general formula $R^1—CO.NR^2.R^3$ where $R^1$ is a hydrogen atom or an alkyl group containing 1 to 5 carbon atoms and $R^2$ and $R^3$, which may be the same or different, are each an alkyl group containing 1 to 5 carbon atoms, or, alternatively $R^2$ and $R^3$ together form a divalent aliphatic group which, together with the adjacent nitrogen atom, forms a heterocyclic ring. Examples of amides of this type are N,N-dimethylformamide, N,N-diethylformamide, N,N-dipropylformamide, N,N-dibutylformamide, N,N-dimethyl acetamide, N,N-diethylacetamide, N,N-dimethylvaleramide, N,N-dimethylpropionamide, N-formylpiperidine and N-formylmorpholine. Of this group of compounds, we prefer to use N,N-dimethylacetamide or N,N-dimethylformamide. The latter two solvents are particularly preferred because they can be used without an additional hydrogen halide acceptor. This simplifies the reaction conditions.

One may also use as Lewis bases compounds of the formula $R^1R^2SO$ where $R^2$ and $R^3$ have the meanings defined above. An example of such a base is dimethyl sulphoxide. Bases of this type are desirably used in conjunction with an added hydrogen halide acceptor.

Another convenient group of Lewis bases are the N,N-dialkylcyanamides, e.g. N,N-dimethylcyanamide.

Yet another group of Lewis bases are tetraalkylureas of the general formula $R^2,R^3N.CONR^2R^3$ where $R^2$ and $R^3$ have the meanings defined above. Examples of such substituted ureas include N,N,N',N'-tetramethylurea and N,N,N',N'-tetraethylurea.

Another group of Lewis bases of a different chemical nature which may be used are the alkyl cyanides of the formula $R^4CN$ where $R^4$ is an alkyl group containing 1 to 5 carbon atoms. With these substances, however, it is necessary to employ an added hydrogen halide acceptor in order to avoid any substantial residue of 7–ACA. Whilst this may be a disadvantage in one sense we have found that when using a mixture of acetonitrile and an organic tertiary base e.g. triethylamine we can obtain very high yields of the desired 7-acylamidocephalosporanic acid. The hydrogen halide acceptor may also be an amide of the formula $R^1.CO.NR^2R^3$ as defined above, particularly N,N-dimethylacetamide.

Although the process according to the invention may be applied directly to 7–ACA we prefer to effect the reaction with an acid addition salt of 7–ACA for the reasons set forth in our above-mentioned application No. 458,446. The reaction conditions required for the salts are in general similar to those required for 7–ACA itself. We particularly prefer to use 7–ACA hydrogen p-toluene sulphonate.

It should be noted that it is not essential for the 7–ACA or salt thereof to be soluble in the reaction medium, and it may be employed as a suspension in the reaction medium. Thus, 7–ACA is only sparingly soluble in N,N-dimethylacetamide or N,N-dimethylformamide but goes into solution as the reaction proceeds. On the other hand, 7–ACA hydrogen p-toluene sulphonate is soluble in N,N-dimethylacetamide or N,N-dimethylformamide.

The acid halide employed will, of course, depend on which acyl group it is desired to introduce at the 7-position of the cephalosporin nucleus, the nature of the acyl group having a distinct bearing on the antibacterial spectrum of the resultant amide. We have conducted our investigations mainly with 2-thienylacetyl chloride because of the favourable spectrum of 7-(thienyl-2'-acetamido)-cephalosporanic acid. However, other acyl groups result in variation of the spectrum and one could, for example, equally use the process of the invention to obtain 7-acylamidocephalosporanic acids having any of the following groups at the 7-position.

(i) R'(CH$_2$)$_n$CO— where R' is aryl, cycloalkyl, substituted aryl, substituted cycloalkyl or heterocyclic and $n$ is an integer from 1–4. Examples of this group include phenylacetyl, nitrophenylacetyl, phenylpropionyl, cyclopentyl, cyclohexyl, and thienyl-3-acetyl; thienyl-2-acetyl of course also falls within this group.

(ii) C$_n$H$_{2n+1}$CO— where $n$ is an integer from 2–7. The alkyl group may be straight or branched and, if desired, may be interrupted by an oxygen or a sulphur atom or substituted by one or more halogen atoms. Examples of such groups include hexanoyl, heptanoyl, octanoyl and butylthioacetyl.

(iii) C$_n$H$_{2n-1}$CO— where $n$ is an integer from 2–7. The alkenyl group may be straight or blanched and, if desired, may be interrupted by an oxygen or a sulphur atom. Examples of such groups include acrylyl, crotoyl and allylthioacetyl.

(iv) R'O CR''R''' CO— where R' has the meaning defined above and R'' and R''' are the same or are different and each is a hydrogen atom or an alkyl, aryl or heterocyclic group. An example of such a group is phenoxyacetyl.

(v) R'SCR''R'''.CO— where R', R'' and R''' are as defined above. Examples of such thio groups include S-phenylthioacetyl, S-chlorophenylthioacetyl and S-bromophenylthioacetyl.

(vi) R'(CH$_2$)$_m$S(CH$_2$)$_n$CR''R'''.CO— where R', R'' and R''' are as defined above, $m$ is an integer from 1–4 and $n$ is 0 or an integer from 1–4. Examples of such a group include S-benzylthioacetyl, benzylthiopropionyl and β-phenethylthioacetyl.

(vii) R'CO— where R' has the meaning defined above. Examples of such groups include benzoyl, substituted benzoyl and cyclopentanoyl.

The acyl halide will normally be used in excess and in general from 1.1 to 2.0 molar proportions will be found adequate, the optimum amount depending on the reaction conditions and in particular on the nature of the hydrogen halide acceptor. Residual excess acyl halide may be destroyed on completion of the reaction e.g. by the addition of methanol.

The process according to the invention may be conducted at a temperature of less than 60° C. Preferably, it is conducted at a temperature of less than 25° C., especially at a temperature in the range from −5° to +15° C.

The 7-acylamidocephalosporanic acid may be recovered from the reaction medium as such or in the form of a salt, e.g. an alkali metal salt by reaction with an alkali metal 2-ethylhexoate.

The general process of the invention may be used to effect acylation of compounds of the general formula:-

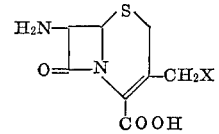

or an acid addition salt thereof, wherein X is a group derived from a nucleophile. e.g. an azide group, or a sulphur containing nucleophile linked through said sulphur. Examples of the latter group include S-thiobenzoyloxy, S-thiopicolinoyloxy, 4-methyl-pyrimidyl-2-thio and 4,6-dimethyl-pyrimidyl-2-thio.

In order that the invention may be well understood the following examples are given by way of illustration only. The sodium salt referred to in the examples is sodium 7-(thienyl-2'-acetamido)cephalosporanate.

(A) ACYLATIONS OF 7–ACA

Example 1

In N,N - dimethylacetamide/triethylamine. — 7 - ACA (2.5 g.) was suspended in N,N-dimethylacetamide (20 ml.). Triethylamine (2.3 ml.) was added and the solid dissolved. 2-Thienylacetyl chloride (1.26 ml.) was added to the solution over 10 minutes, the mixture poured into dilute hydrochloric acid (2 N; 150 ml.) and the product extracted into methylene chloride (2×25 ml., 1×10 ml.). The extracts were bulked and the solution was dried and mixed with a 12.6% w./v. solution of sodium 2-ethylhexoate in ethyl acetate (15 ml.). The sodium salt that precipitated was harvested by filtration and washed with acetone to yield 85.7% of theory (3.3 g.), [α]$_D$+120° (c., 1 in H$_2$O).

Example 2

In N,N-dimethylacetamide.—7–ACA (5 g.) was stirred as a suspension in N,N-dimethylacetamide (40 ml.). 2-Thienylacetyl chloride (4.55 ml., 2 mol. equiv.) was added over 10 minutes at a temperature 18 to 20°. Methanol (5 ml.) was added to decompose excess acid chloride and the mixture poured into water (100 ml.) and the 7-2'-thienylacetamidocephalosporanic acid extracted into methylene chloride (100 ml.). The sodium salt was isolated as in Example 1 in 89.7% of theoretical yield (6.9 g.), [α]$_D$+131.8° (c., 1.0 in H$_2$O).

Example 3

In acetonitrile/triethylamine with calcium carbonate present.—7–ACA (5 g.) was suspended with stirring in acetonitrile (40 ml.). Triethylamine (4 ml.) was added and the solid dissolved. Calcium carbonate (0.75 g.) was added, followed by 2-thienylacetyl chlcride (2.86 ml.) by dropping funnel over 10 minutes. The calcium carbonate was filtered off and the sodium salt isolated from the filtrate as in Example 1 to give 88.5% of theory (6.81 g.), [α]$_D$+127° (c., 1 in H$_2$O).

Example 4

In acetonitrile/triethylamine.—7–ACA (5 g.) was dissolved in acetonitrile (35 ml.) by addition of triethylamine (5.39 ml.). With stirring, 2-thienylacetyl chloride (2.52 ml.) was added to the solution over 10 minutes. The precipitated triethylamine hydrochloride was filtered off and the filtrate diluted with 12.6% w./v. sodium 2-ethylhexoate in ethyl acetate (25 ml.). The product was isolated by filtration and washed with acetone to give a 95% of theory yield (7.3 g.) of the sodium salt [α]$_D$+129.6° (c., 1.0 in H$_2$O).

(B) ACYLATIONS OF 7-ACA HYDROGEN P-TOLUENE SULPHONATE DIHYDRATE

Example 5

In acetonitrile/triethylamine.—7–ACA hydrogen p-toluene sulphate dihydrate (8.15 g.), suspended in acetonitrile (35 ml.), was cooled to —10° and treated with triethylamine (7.15 ml.). To the resulting solution, 2-thienylacetyle chloride (2.86 ml.) in acetonitrile (5 ml.) was added over 15 minutes, maintaining a temperature of —5° to 0° by means of external cooling. Water (40 ml.) and diethyl ether (100 ml.) were added and the layers separated. The aqueous layer was re-extracted with diethyl ether (40 ml.) and acidified to pH 1 with concentrated hydrochloric acid (4 ml.). The solution was extracted with 3:2 mixture of chloroform and tetrahydrofuran (40, 30, 30 ml.) and the organic layers were bulked. The resulting solution was dried over anhydrous magnesium sulphate and treated with a 12.6% w./v. solution of sodium 2-ethylhexoate in ethyl acetate (30 ml.). The solid was filtered off, washed with acetone and dried in vacuo to give the required sodium salt (6.1 g., 85%), $[\alpha]_D+133°$ (c., 1.0 in $H_2O$), $E^{1\%}_{1cm.}$ $\lambda$ max. 237 m$\mu$ (306), $\lambda$ infl. 260 m$\mu$ (200) (pH 6 buffer)

Example 6

In N,N-dimethylacetamide.—7–ACA hydrogen p-toluene sulphonate dihydrate (10 g.) in N,N-dimethylacetamide (33.5 ml.) was treated with 2-thienylacetyl chloride (5.15 ml.) at 10°. The reaction was completed by stirring for a further 30 minutes and the solution poured into a mixture of 2 N-hydrochloric acid (98.6 ml.) and methylene chloride (75 ml.). The layers were allowed to settle and separated. The aqueous phase was washed with methylene chloride (3×25 ml.) and the organic layers were combined. The resulting solution was washed with 2 N-hydrochloric acid (100 ml.), 2% aqueous sodium chloride solution (100 ml.) and dried over anhydrous magnesium sulphate. Methyl alcohol (18.5 ml.) was added to the dry solution, followed by an 11.8% w./v. solution of sodium 2-ethylhexoate in ethyl acetate (43.6 ml.). The white solid was filtered off, washed with acetone and dried in vacuo to give the required sodium salt (7.21 g.; 83% of theory), $[\alpha]_D+129°$ (c., 1.0 in $H_2O$), $E^{1\%}_{1cm.}$ $\lambda$ max. 237 m$\mu$ (333), $\lambda$ infl. 260 m$\mu$ (206) (pH 6 buffer)

Example 7

In N,N-dimethylacetamide with calcium carbonate.—Calcium carbonate (25 g.) was suspended by stirring in a solution of 7–ACA hydrogen p-toluene sulphonate dihydrate (50 g.) in N,N-dimethylacetamide (250 ml.). 2-thienylacetyl chloride (25.8 ml.) was added over 10 minutes and the temperature controlled at 15–20° by external ice/water cooling. Methanol (46 ml.) was added and the mixture was poured into 2 N-hydrochloric acid (493 ml.) and methylene chloride (375 ml.). The product was isolated as in Example 6 to give the required sodium salt (40 g., 92%), $[\alpha]_D+133°$ (c., 1.0 in water), $E^{1\%}_{1cm.}$ $\lambda$ max. 237 m$\mu$ (340), $\lambda$ infl. 260 m$\mu$ (212) (in pH 6 buffer)

Colour of 25% solution 0.2Y Lovibond units.

Example 8

In acetonitrile containing N,N-dimethylacetamide.—A suspension of 7-ACA hydrogen p-toluene sulphonate dihydrate (50 g.) in acetonitrile (250 ml.) containing N,N-dimethylacetamide (41.2 ml.) was treated with 2-thienylacetyl chloride (18.4 ml.) in acetonitrile (25 ml.) at 15°. The solid dissolved during the addition and the solution was clarified by filtration. The filtrate was poured into a mixture of methylene chloride (250 ml.) and water (425 ml.). The layers were separated. The aqueous phase was extracted with methylene chloride (2×125 ml.) and the organic layers bulked. The resulting solution was washed with water (2×125 ml.) and dried over anhydrous magnesium sulphate. Methanol (92.5 ml.) was added, followed by an 11.8% w./v. solution of sodium 2-ethylhexoate in ethyl acetate (219 ml.). The white solid was filtered off to give the sodium salt (38 g., 87.5% of theory), $[\alpha]_D+131°$ (c., 1.0 in water).

Example 9

7–ACA hydrogen p-toluene sulphonate dihydrate (25 g.) was suspended by stirring the acetonitrile (100 ml.) and N,N-dimethylacetamide (20 ml.) added. Most of the solid dissolved. Stirring was continued and ice water cooling was applied to the flask while 2-thienylacetyl chloride (9 ml.) was added as a single charge. The reaction temperature rose from 15 to 22° and all the suspended solid dissolved. The reaction was completed by stirring for 10 minutes. Acetone (200 ml.) was added and the solution was stirred while sodium bicarbonate (17 g.) was introduced. Stirring was continued. When the pH of the reaction mixture had risen to 2.5 (glass electrode; ~45 mins.), the solids were removed by filtration. The filtrate was treated with sodium 2-ethyl-hexoate (13 g.) in methanol (30 ml.). The solid was isolated as before to give the sodium salt (19.86 g.) as a white crystalline solid in a yield of 91% of theory $[\alpha]_D+131.8°$ (c., 1.0% in $H_2O$). $\lambda$ max. 237 m$\mu$.

$E^{1\%}_{1cm.}$ 330, $\lambda$ max. 260 m$\mu$ $E^{1\%}_{1cm.}$ 208

Colour (1 g. in 4 ml. $H_2O$, 1 cm. cell) 0.7Y, 0.2R Lovibond units. Paper chromatogram 1 spot.

Example 10

7–ACA hydrogen p-toluene sulphonate (25 g.) was treated with 2-thienylacetyl chloride (12.9 ml.) in a suspension of calcium carbonate (12.5 g.) in N,N-dimethylacetamide (125 ml.) and the product extracted into methylene chloride was described in Example 6. The washed extracts were bulked and the resulting solution diluted with acetone (225 ml.). Sodium 2-ethylhexoate (13 g.) in methanol (70 ml.) was added and the product isolated as before. The sodium salt (20 g.; 92% of theory) was a white crystalline solid, $[\alpha]_D$ 131° (c., 1.0 in water).

$E^{1\%}_{1cm.}$ at $\lambda$ max. 237 m$\mu$ 327; $\lambda$ max. 260 m$\mu$ $E^{1\%}_{1cm.}$ 205 (in pH 6 buffer)

Example 11

In N,N-dimethylacetamide with calcium carbonate.—To a suspension of calcium carbonate (67.5 g.) in a solution of 7–ACA hydrogen p-toluene sulphonate dihydrate (100 g.) in N,N-dimethylacetamide (550 ml.) at —5°, S-benzylthioacetyl chloride (70 ml.) was added in 15 minutes with stirring, the temperature being kept below 10°. After 25 minutes more, methanol (ca. 10 ml.) was added and, after stirring for 20 minutes, the reaction mixture was poured into 2 N-hydrochloric acid (1.5 l.) saturated with ammonium chloride. The product was extracted into tetrahydrofuran/petrol mixture (4:1, 1 litre, 500 ml., 250 ml.) and the organic phases washed with saturated ammonium sulphate solution (2×300 ml.). After drying the combined extracts (sodium sulphate) and evaporation, the resultant gum was dissolved in acetone (700 ml.) and a solution of sodium 2-ethylhexoate in acetone (22.3%; 300 ml.) added. Crystallisation of the sodium 7-S-benzylthioacetamidocephalosporanate was allowed to proceed at 0°. The product was isolated in the usual way to give 82 g. (86.3% theory), $[\alpha]_D+100.1°$ (c., 0.94 in water).

Example 12

In acetonitrile containing N,N-dimethylacetamide.—To a stirred solution of 7–ACA hydrogen p-toluene sulphonate dihydrate (20 g.) in acetonitrile (90 ml.) and N,N-dimethylacetamide (16.5 ml.) at 15°, S-benzylthioacetyl chloride (8.9 ml.) in acetonitrile (10 ml.) was added dropwise, keeping the temperature at 15±2°. After 15 minutes more, methanol (5 ml.) was added, the mixture acidified with 10% hydrochloric acid (125 ml.), and was extracted with methylene chloride (60 ml.; 2×20 ml.). The organic extracts were washed (10% sodium chloride solution, 2×50 ml.), dried (sodium sulphate) and evaporated to a gum. The latter was dissolved in acetone (115 ml.) and a solution of sodium 2-ethylhexoate (7.5 g.) in ethyl acetate (60 ml.) added. After crystallisation, the sodium 7-S-benzylthioacetamidocephalosporanate was filtered, washed and dried to give 16.58 g. (86.8%), $[\alpha]_D +98.25°$ (1., 1.02 in water).

Example 13

3 - (4,6 - dimethylpyrimidin - 2 - ylthiomethyl) - 7 - (phenylacetamido) - ceph - 3 - em - 4 - oic acid.—3 - (4, 6 - dimethylpyrimidin - 2 - ylthiomethyl) - 7 - aminoceph-3-em-4-oic acid (4.20 g.) was suspended in N,N-dimethylacetamide (50 ml.) and stirred while phenylacetyl chloride (2.78 g.) was added dropwise over a period of 10 min. The solution was stirred for a further 10 mins. and methanol (5 ml.) was added. The dark solution was poured into a mixture of water (100 ml.) and chloroform (40 ml.). The organic layer was removed and the aqueous layer extracted with chloroform (3×40 ml.). The combined organic layers were washed with dilute hydrochloric acid (2 N, 2×40 ml.), water (40 ml.) and brine (40 ml.), dried over sodium sulphate and evaporated under reduced pressure to a dark oil. This oil in ethyl acetate (200 ml.) was extracted with 3% sodium bicarbonate (500 ml.). The aqueous layer was collected and adjusted to pH 2 with dilute hydrochloric acid to give a white precipitate. The suspension was extracted with ethyl acetate (4×150 ml.) and the organic phase washed with water (2×100 ml.), brine (100 ml.), and dried over sodium sulphate. Evaporation of the dried solution under reduced pressure gave a fawn coloured solid (2.64 g.). The solid was twice recrystallised from aqueous acetone (25% water) to give a crystalline product, $[\alpha]_D -73.3°$ (c., in dioxan); λ max. 264 m$\mu$.

($E_{1\,cm.}^{1\%}$ 332, ε 15,600)

$\nu_{max.}^{Nujol}$ 1780 (β-lactam)

1720 (un-ionised carboxyl), 1664 and 1553 cm.$^{-1}$ (amide) Found: C, 56.2; H, 4.8. $C_{22}H_{22}O_4N_4S_2$ requires C, 56.2; H, 4.7%.

Example 14

3 - (4,6 - dimethylpyrimidin - 2 - ylthiomethyl) - 7 - (2-thienylacetamido) - ceph - 3 - em - 4 - oic acid.—3-(4,6-dimethylpyrimidin - 2 - ylthiomethyl) - 7 - aminoceph-3-em-4-oic acid (1.5 g.) was suspended in dimethylacetamide (18 ml.) and stirred while 2-thienylacetyl chloride (1.0 g.) was added dropwise over 10 mins. The solution was stirred for a further 10 mins. and methanol (1.8 ml.) was then added. The resulting dark solution was poured into a mixture of water (36 ml.) and chloroform (14 ml.). The organic layer was removed and the aqueous layer was re-extracted twice with chloroform. The combined organic layers were washed with dilute hydrochloric acid (2 N, 3×14 ml.), water (14 ml.) and brine (14 ml.), dried over sodium sulphate and evaporated under reduced pressure to a brown gum. This residue in ethyl acetate (71.5 ml.) was extracted with 3% sodium bicarbonate solution (178 ml.). The aqueous layer was separated and adjusted to pH 2 with dilute hydrochloric acid to give a suspension of an off-white crystalline solid. The suspension was extracted with ethyl acetate (4×53 ml.), the organic phase washed with water (2×30 ml.), brine (30 ml.) and dried over sodium sulphate. Evaporation of the dried solution under reduced pressure gave an off-white crystalline product which was recrystallised from hot water (5 ml.) and acetone (15 ml.) to give a white crystalline solid (0.154 g.), $[\alpha]_D -75°$ (c., 1 in dioxan); λ max. 241–242 m$\mu$.

($E_{1\,cm.}^{1\%}$ 410, ε 19,800)

λ infl. 264 m$\mu$ ($E_{1\,cm.}^{1\%}$ 367, ε 17,800)

$\nu$ max. (in Nujol) 1775 (β-lactam), 1702 (un-ionised carboxyl), 1660 and 1540 cm.$^{-1}$ (amide).

Example 15

3 - benzoylthiomethyl - 7 - (2' - thienylacetamido)-ceph-3-em-4-oic acid (TATB).—7-amino-3-benzoylthiomethylceph-3-em-4-oic acid (4.20 g., 0.12 mole) was suspended and stirred in N,N-dimethylacetamide (50 ml.) at room temperature, and 2-thienylacetyl chloride (2.78 g., 0.24 mole) was added dropwise over 10 min. The mixture was stirred for a further 10 min., during the course of which solution was obtained. Methanol (5 ml.) was added to the resulting dark solution which was then poured into a mixture of water (100 ml.) and methylene chloride (40 ml.). The dark organic layer was collected and combined with the further methylene chloride extracts (3×40 ml.) of the aqueous layer. The extract was washed with 2 N-hydrochloric acid (2×40 ml.), water (40 ml.), and brine (40 ml.), then dried (sodium sulphate). Elimination of the solvents in vacuo left a dark brown semi-solid (7.51 g.). This was dissolved in a mixture of ethyl acetate (200 ml.) and 3%-sodium bicarbonate (500 ml.). The aqueous layer was collected and adjusted to pH 1.5 by the cautious addition of 2 N-hydrochloric acid, then extracted with ethyl acetate (4×150 ml.). This extract was washed with water (2×100 ml.) and brine (100 ml.), then dried (sodium sulphate). Elimination of the solvent in vacuo left a deep golden gum (5.48 g.), which was crystallized from acetone-water (1:1, 25 ml.), giving fawn material collected by filtration, washed with acetone (2×5 ml.) (this took out much of the color) and ether (3×10 ml.), and then dried in vacuo over phosphorous pentoxide, giving impure TATB (2.56 g., 45%), which ran as a single spot ($R_f$ 0.70) on paper chromatography (using the descending technique and Whatman No. 1 paper buffered with 0.1 M aqueous sodium acetate at ph 5.0, the developing solvent being the upper phase from the mixture ethyl acetate/n-butanol/ph 5 buffer, 8⅛, the lower phase being placed in the bottom of the tank), whose infrared (Nujol mull) and proton magnetic resonance (dimethylsulphoxide solution) spectra were identical with those of pure TATB but whose ultraviolet spectrum (ethanol) was less intense (λ max. 237–238 m$\mu$, ε 22,200; λ max. 273–275, m$\mu$, ε 15,000) than that of pure material, and whose rotation was substantially less $[\alpha]_D^{22} = -94°$ (c.=1.0 dioxan) than that of TATB.

The combined mother liquor and washings from the impure product were evaporated to dryness in vacuo, leaving a dark syrup (2.86 g.) which could not be crystallised. Paper chromatography revealed that in addition to TATB there were considerable amounts of less mobile ($R_f<0.5$) materials present. The syrup was subjected to a 5-transfer countercurrent distribution in the solvent system used for paper chromatography, 40 ml. aliquots of each phase being employed in each of the 6 equilibration vessels, the lower phase being the mobile phase. When the transfers were complete the contents of each phase were examined by paper chromatography. This revealed that the upper phases in vessels 1 and 2 contained virtually all the TATB and that it was free from less mobile contaminants. These two phases were combined and stripped solvent in vacuo, leaving a dark gum (1.77 g.), which was crystallised from acetone-water (1:1, 15 ml.), giving fawn material which was collected by filtration, washed with acetone (2×2 ml.) (this took out most of the colour) and ether (3×10 ml.), then dried in vacuo over phosphorous pentoxide, giving impure TATB (0.46 g., 8%), $R_f$ 0.70, infrared (Nujol mull) and proton magnetic resonance (dimethylsulphoxide solution) spectra identical with those of TATB, ultraviolet spectrum (ethanol) λ max. 237–238 mμ, ε 22,000; λ max. 273–274 mμ, ε 14,500, and optical rotation $[\alpha]_D^{22} = -103°$ (c.=1.00, dioxan).

The two crude preparations of TATB were combined and a portion (2.80 g.) was heated in acetone (10 ml.) at reflux for 5 min., then kept at 0° for 2 hr. The solid was collected by filtration, washed with cold acetone (2 ml.) and ether (3×10 ml.), then dried in vacuo over phosphorus pentoxide, giving TATB as a colourless powder (2.22 g.), M.P. 191–192° (decomp.), λ max. (EtOH) 237–238 mμ, ε 23,700, and 273–275 mμ, ε 17,800, $[\alpha]_D^{21} -131°$ (c.=1.00 dioxan).

Example 16

3 - azidomethyl - 7 - bromoacetamidoceph-3-em-4-oic acid.—By an analogous reaction to Example 15, from 7-amino-3-azidomethylceph-3-em-4-oic acid (2.55 g., 0.01 mole) and bromoacetylchloride (3.20 g., 0.02 mole), crude 3 - azido - methyl-7-bromoacetamidoceph-3-em-4-oic acid was obtained as a brown gum (0.52 g., 14%), identified by $R_f$ (0.58) and infrared spectrum with a sample of the acid prepared by acylation in ethyl acetate [ν max. (Nujol) 2110, 1770, and 1665 cm.$^{-1}$].

Example 17

Acylation of 3 - azidomethyl-7-aminoceph-3-em-4-oic acid.—To a solution of 7-ACA hydrogen p-toluene sulphonate dihydrate (10 g.) in water (100 ml.), sodium azide (2 g.) was added and the pH adjusted to 8 with 2 N-sodium carbonate. The mixture was heated at 50° for 17½ hours, cooled and acidified at pH 2 with dilute hydrochloric acid. After cooling, a brown solid was filtered off (2.84 g.). This showed strong azide absorption and negligible acetyl absorption in its infrared spectrum.

A portion of the solid (1 g.) was converted into its hydrogen p-toluene sulphonic acid salt by treatment in acetone with p-toluene sulphonic acid and the resulting salt dissolved in N,N-dimethylacetamide (10 ml.) and calcium carbonate (0.35 g.) added. With stirring and cooling to 0°, S-benzylthioacetyl chloride (0.25 ml.) was added and then methanol (2 ml.). After 5 minutes, the mixture was poured into N-hydrochloric acid and extracted three times with ethyl acetate. After washing and drying, the organic solvent was evaporated and the residue dissolved in acetone and treated with sodium 2-ethylhexoate solution in acetone (22%, 2 ml.). The acetone was evaporated and the residue triturated with industrial methylated spirits and the solid filtered off (0.15 g.). This was shown by paper chromatography to be sodium 3-azidomethyl-7-S-benzylthioacetamidoceph-3-em-4-oate.

We claim:

1. A process for the manufacture of a 7-acylamidocephalosporanic acid, comprising reacting under substantially anhydrous conditions, a compound of the formula

R—X in which R is an acyl radical selected from the group consisting of R'(CH$_2$)$_n$CO— in which R' is a member selected from the group consisting of phenyl, nitrophenyl, cyclopentyl, cyclohexyl and thienyl, and n is 0 or an integer from 1–4; hexanoyl; heptanoyl; butylthioacetyl; acrylyl; crotonyl; allylthioacetyl; R'OCH$_2$CO— in which R' has the meaning defined above; R"SCH$_2$CO— in which R" is a member selected from the group consisting of R' as defined above, chlorophenyl and bromophenyl and R'(CH$_2$)$_m$S(CH$_2$)$_n$CH$_2$CO— in which R' has the meaning defined above, m is an integer from 1 to 4 and n is 0 or an integer from 1 to 4 and X is an atom selected from the group consisting of chlorine and bromine with a solution or suspension of an acid addition salt of 7-aminocephalosporanic acid in at least one Lewis base liquid under the conditions of the reaction selected from the group consisting of a compound of the formula

R$^1$.CO.NR$^2$.R$^3$ in which R$^1$ is selected from the group consisting of hydrogen and alkyl of 1 to 5 carbon atoms and R$^2$ and R$^3$ are each alkyl of 1 to 5 carbon atoms; a compound of the formula

R$^2$.R$^3$SO in which R$^2$ and R$^3$ have the meanings defined above; N,N-dimethylcyanamide; a compound of the formula

R$^2$.R$^3$N.CONR$^2$.R$^3$ in which R$^2$ and R$^3$ have the meanings defined above and a compound of the formula

R$^4$CN in which R$^4$ is alkyl of 1 to 5 carbon atoms and containing a hydrogen halide acceptor selected from the group consisting of said Lewis base of the formula

R$^1$.CO.NR$^2$.R$^3$ as defined above, a tri (lower-alkyl) amine, an alkali metal carbonate, an alkali metal bicarbonate, an alkaline earth metal carbonate and an alkaline earth metal bicarbonate.

2. A process as defined in claim 1 in which said Lewis base is said compound of the formula

R$^1$.CO.NR$^2$.R$^3$

3. A process as defined in claim 2 in which said Lewis base is N,N-dimethylacetamide.

4. A process as defined in claim 2 in which said compound of the formula R—X is 2-thienylacetyl chloride.

5. A process as defined in claim 1 in which said Lewis base is said compound of the formula R$^4$CN.

6. A process as defined in claim 1 in which there is present a mixture containing said compound of the formula R$^1$.CO.NR$^2$.R$^3$ and said compound of the formula R$^4$CN.

7. A process as defined in claim 1 in which said acid addition salt is 7-aminocephalosporanic acid hydrogen-p-toluene sulphonate.

8. A process for the manufacture of a 7-acylamido derivative of a compound of the formula

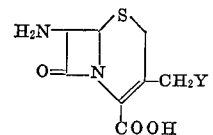

in which Y is a group derived from a nucleophile, comprising reacting under substantially anhydrous conditions, a compound of the formula

R—X in which R is an acyl radical selected from the group consisting of R'(CH$_2$)$_n$CO— in which R' is a member selected from the group consisting of phenyl, nitrophenyl, cyclopentyl, cyclohexyl, and thienyl, and n is 0 or an integer from 1 to 4; hexanoyl; heptanoyl; butylthioacetyl; acrylyl; crotonyl; allylthioacetyl; R'OCH$_2$CO— in which R' has the meaning defined above; R"SCH$_2$CO— in which R" is a member selected from the group consisting of R' as defined above, chlorophenyl and bromophenyl and R'(CH$_2$)$_m$S(CH$_2$)$_n$CH$_2$CO— in which R' has the meaning defined above, m is an integer from 1 to 4 and n is 0 or an integer from 1 to 4 and X is an atom selected from the group consisting of chlorine and bromine with a solution or suspension of an acid addition salt of said compound in at least one Lewis base liquid under the conditions of the reaction selected from the group consisting of a compound of the formula

R$^1$.CO.NR$^2$.R$^3$ in which R¹ is selected from the group consisting of hydrogen and alkyl of 1 to 5 carbon atoms and R² and R³ are each alkyl of 1 to 5 carbon atoms; a compound of the formula $$R^2.R^3SO$$

in which R² and R³ have the meanings defined above; N,N-dimethylcyanamide; a compound of the formula $$R^2.R^3N.CONR^2.R^3$$

in which R² and R³ have the meanings defined above and a compound of the formula $$R^4CN$$

in which R⁴ is alkyl of 1 to 5 carbon atoms and containing a hydrogen halide acceptor selected from the group consisting of said Lewis base of the formula $$R^1.CO.NR^2.R^3$$

as defined above, a tri (lower-alkyl) amine, an alkali metal carbonate, an alkali metal bicarbonate, an alkaline earth metal carbonate and an alkaline earth metal bicarbonate.

9. A process for the manufacture of 7 - (thienyl - 2'-acetamido) cephalosporanic acid, comprising reacting under substantially anhydrous conditions, 2-thienylacetyl chloride with a solution or suspension of 7-aminocephalosporanic acid hydrogen p-toluene sulphonate in an inert Lewis base mixture liquid under the conditions of the reaction and comprising a compound of the formula $$R^1.CO.NR^2.R^3$$

where R¹ is selected from the group consisting of hydrogen and alkyl groups containing 1 to 5 carbon atoms and R² and R³ are each alkyl groups containing 1 to 5 carbon atoms and a compound of the formula $$R^4CN$$

where R⁴ is an alkyl group containing 1 to 5 carbon atoms.

References Cited
UNITED STATES PATENTS

| | | |
|---|---|---|
| 3,222,362 | 12/1965 | Flynn. |
| 3,275,626 | 9/1966 | Morin et al. |
| 3,373,155 | 3/1968 | Ekström et al. |
| 3,245,983 | 4/1966 | Doyle et al. _____ 260—239.1 |
| 3,274,175 | 9/1966 | Richards et al. _____ 260—559 |

NICHOLAS S. RIZZO, Primary Examiner